Oct. 7, 1947.　　　　E. BEYER　　　2,428,694
EXCAVATING MACHINE
Filed Sept. 10, 1945　　2 Sheets-Sheet 2
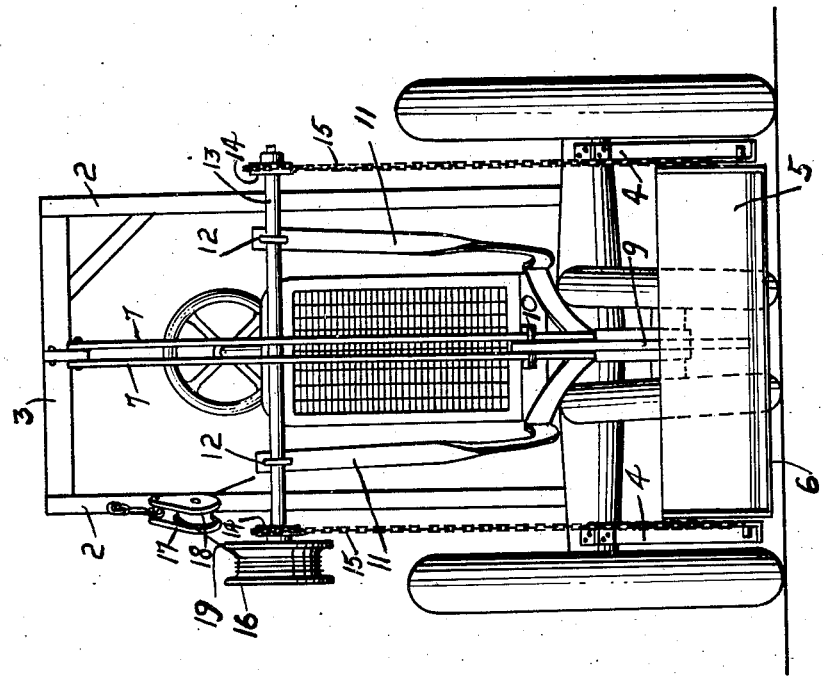
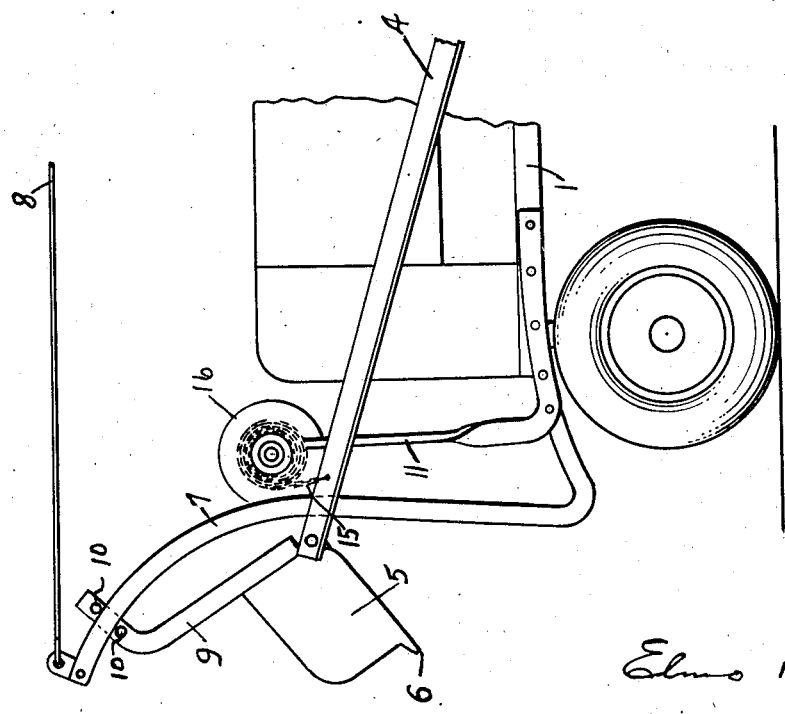
Inventor
Elmo Beyer
By E. V. Hardway
Attorney Patented Oct. 7, 1947

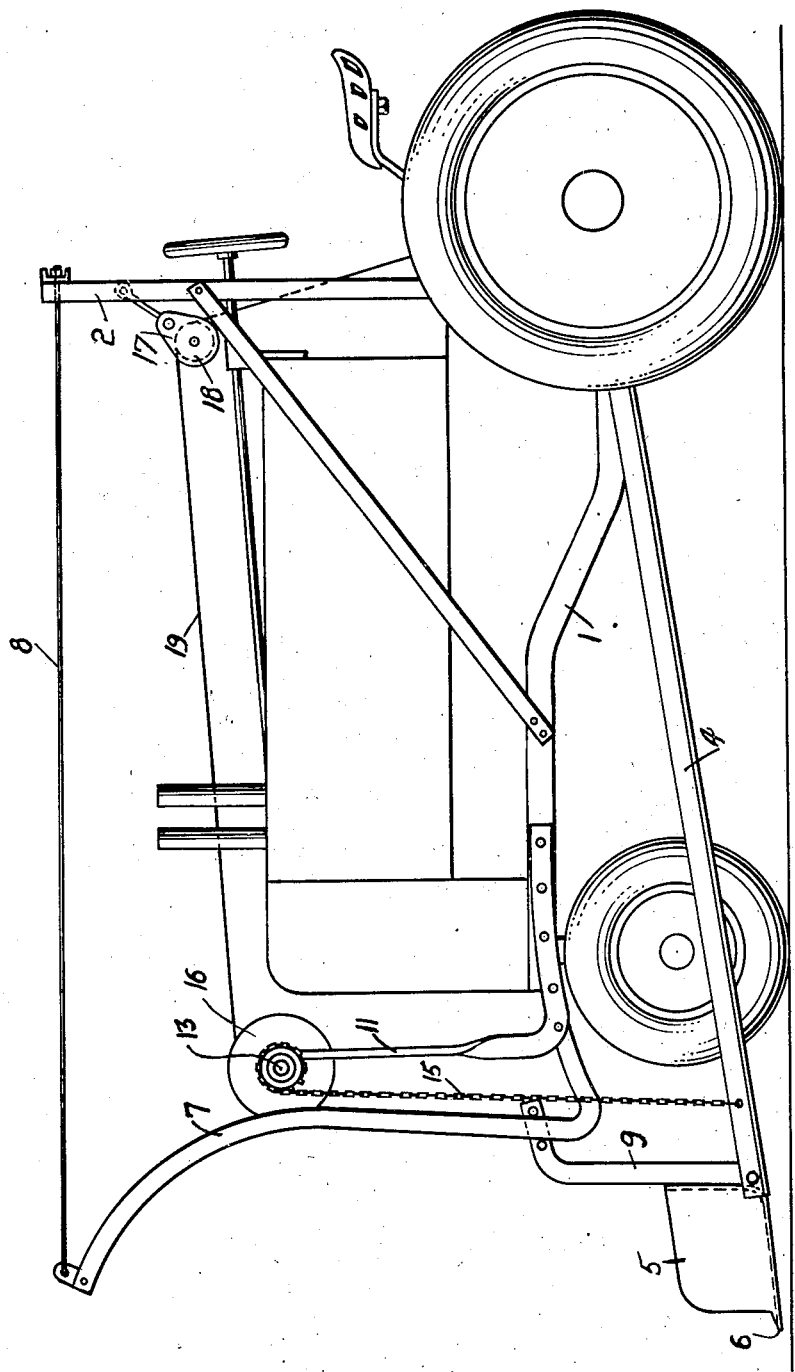

2,428,694

UNITED STATES PATENT OFFICE 2,428,694

EXCAVATING MACHINE

Elmo Beyer, Corpus Christi, Tex.

Application September 10, 1945, Serial No. 615,395

5 Claims. (Cl. 214—139)

This invention relates to an excavating machine.

An object of the invention is to provide a machine of the character described whereby earth, and the like, may be readily excavated and moved. The invention is designed not only for excavation purposes but may be used for moving earth from place to place or for levelling uneven earth surfaces.

It is another object of the invention to provide equipment of the character described that is of very simple construction, may be cheaply produced and easily applied to a conventional tractor.

It is a further object of the invention to provide an excavating, or earth handling, machine embodying novel means for dumping the excavating bucket, or scoop.

Other objects and advantages will be apparent from the following specification which is illustrated by the accompanying drawings, wherein:

Figure 1 is a side elevation of the excavating equipment.

Figure 2 is a fragmentary side elevation showing the scoop, or bucket, in dumping position; and Figure 3 is a front elevation.

In the drawings the numeral 1 designates a tractor as a whole.

Secured to the rear end of the tractor frame and upstanding therefrom are the uprights 2, 2 whose upper ends are connected by the cross beam 3.

The numerals 4, 4 designate the side lifting levels whose rear ends are pivoted to the tractor structure and whose forward ends extend forwardly beyond the tractor.

Mounted between the forward ends of the levers 4, 4 there is a scoop, or bucket, 5 having a bottom, end walls and a rear wall. The bottom terminates in a forwardly directed blade 6.

It will be noted that the lift levers 4 are pivoted to the bucket at the rear, and near the bottom, thereof.

Suitably anchored to the forward end of the tractor structure and spaced forwardly thereof there are the upstanding guide bars 7, 7 which are spaced a small distance apart and whose upper ends are forwardly curved thus forming a guide, or track.

A reinforcing rod 8 is connected at its forward end to the upper ends of the bars 7 and at its rear end to the cross bar 3.

Fixed to the rear wall of the scoop 5, intermediate the ends thereof, and upstanding therefrom there is the arm 9 whose upper end is rearwardly turned and fitted between the guide bars 7 and fitted through the rearwardly turned end of said arm on opposite sides of the guide are the rollers 10, 10.

When the scoop is in its lower position the bottom of it will be parallel with the ground surface and as it is lifted upwardly by the lift levers 4 it will be maintained in that position until the rearwardly turned end of the arm 9 reaches the forwardly curved portion of the guide whereupon the scoop will be swung to dumping position, as shown in Figure 4, and the load will be dumped from it.

Suitably secured to the side members of the framework of the tractor there are the upstanding standards 11, 11 whose upper ends have the transversely aligned bearings 12, 12 in which the transverse shaft 13 is mounted to rotate.

This shaft has the spaced sprockets 14, 14 fixed thereon over which the sprocket chains 15, 15 operate. The lower ends of the sprocket chains are connected to the corresponding lift levers 4, 4.

Fixed on one end of the shaft 13 there is a cat head 16 and attached to the corresponding upright 2 there is a sheave block 17 having the sheave 18 therein.

A lifting cable 19 is attached, at one end, to the cat head 16 and is wound around said cat head and operates over the sheave 18 and its other end may be connected to a conventional cable winding drum under the control of the operator and operatively connected with the tractor motor. As the cable is wound on said drum the cat head 16 and shaft 13 will be rotated to lift the levers 4 and scoop 5 and as the scoop is elevated it will be dumped by the arm 9 moving along the forwardly curved upper end of the guide, as herein above stated.

Upon release of the cable 19 the scoop will move downwardly by gravity to the position shown in Figure 1, with its scoop 6 directed forwardly and in position for gathering in the load as the tractor is moved forwardly.

What I claim is:

1. An excavating machine comprising, a carriage, forwardly extended, side, lifting levers pivoted, at their rear ends, to the carriage, a forwardly directed scoop between the forward ends of the levers and pivoted thereto, a track fixed to and upstanding from the forward end of the carriage and whose upper end is curved forwardly, a rigid tilting arm one end of which is rigidly connected to the rear of the scoop and whose other end has a sliding connection with the track whereby the scoop is tilted to dumping position as the arm moves upwardly along the curved end of the track.

2. An excavating machine comprising, a carriage, forwardly extended, side, lifting levers pivoted, at their rear ends, to the rear end of the carriage, a forwardly directed scoop between the forward ends of the levers and pivoted thereto, a track fixed to and upstanding from the forward end of the carriage and whose upper end is curved forwardly, a rigid tilting arm one end of which is rigidly connected to the rear of the scoop and whose other end is rearwardly turned and has a sliding connection with the track whereby the scoop is gradually tilted to dumping position as the arm moves upwardly along the curved end of the track, and means for lifting said side levers and scoop.

3. An excavating machine comprising, a carriage, a lifting lever on each side of the carriage whose rear ends are pivoted to the rear end of the carriage and whose other ends are extended forwardly beyond the carriage, a scoop between the forward ends of the levers and pivoted thereto, on a transverse axis, and having a forwardly directed transverse, scooping blade, a continuous, rigid, track fixed to and upstanding from the forward end of the carriage and whose upper end is forwardly curved, a rigid arm fixed to the rear end of the scoop and whose upper end is rearwardly turned and slidably connected with and movable along the track and effective to dump the scoop as the arm moves upwardly along the curved end of the track.

4. An excavating machine comprising, a carriage, a lifting lever on each side of the carriage whose rear ends are pivoted to the carriage and whose other ends are extended forwardly beyond the carriage, a scoop between the forward ends of the levers and pivoted thereto, on a transverse axis, and having a forwardly directed transverse scooping blade, a rigid track fixed to and upstanding from the forward end of the carriage and whose upper end is forwardly curved, a rigid arm fixed to and upstanding from the rear end of the scoop and movable along the track and effective to dump the scoop as the arm moves upwardly along the curved end of the track, and means on the carriage and operatively connected with said levers for lifting said levers and scoop.

5. A machine for moving earth, and the like, comprising, a movable carriage, levers pivoted, at their rear ends, to the rear end of the carriage and spaced apart and whose forward ends extend in front of the carriage, a forwardly directed scoop mounted between the forward ends of the levers to pivot on a transverse axis, a rigid guide extending upwardly from the forward end of the carriage and whose upper end is forwardly curved, a rigid arm fixed to the rear of the scoop and extending upwardly therefrom and whose upper end is rearwardly turned and has a sliding connection with the guide and arranged to tilt the scoop forwardly as the arm moves along the curved portion of the guide as the scoop is elevated, and means under the control of an operator for elevating and lowering said levers and scoop.

ELMO BEYER.

REFERENCES CITED

The following references are of record in the file of this patent:

UNITED STATES PATENTS

| Number | Name | Date |
|---|---|---|
| 768,362 | Gordon | Aug. 23, 1904 |
| 856,018 | Belden | June 4, 1907 |
| 1,111,846 | Mayer | Sept. 29, 1914 |
| 1,661,244 | Westling | Mar. 6, 1928 |
| 1,912,816 | Anthony | June 6, 1933 |
| 2,099,604 | Gunning | Nov. 16, 1937 |